United States Patent
Dohmae et al.

(10) Patent No.: US 6,617,819 B2
(45) Date of Patent: Sep. 9, 2003

(54) METHOD OF CONTROLLING PREHEATING POWER AND MECHANISM FOR PROVIDING PREHEATING

(75) Inventors: Hiroshi Dohmae, Osaka (JP); Tomoisa Taniguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/979,661

(22) PCT Filed: Mar. 26, 2001

(86) PCT No.: PCT/JP01/02430
§ 371 (c)(1),
(2), (4) Date: Nov. 26, 2001

(87) PCT Pub. No.: WO01/75378
PCT Pub. Date: Oct. 11, 2001

(65) Prior Publication Data
US 2003/0098298 A1 May 29, 2003

(30) Foreign Application Priority Data
Mar. 30, 2000 (JP) ................................ P2000-093442

(51) Int. Cl.[7] ............................................. G05B 11/28
(52) U.S. Cl. .................... 318/599; 318/436; 318/444; 318/801
(58) Field of Search ........................ 318/436, 599, 318/801, 444

(56) References Cited

U.S. PATENT DOCUMENTS

| 4,135,122 A | * | 1/1979 | Holmquist et al. | ......... 318/436 |
| 4,638,643 A | * | 1/1987 | Sakazume et al. | ........... 62/209 |
| 5,896,021 A | | 4/1999 | Kumar | |

FOREIGN PATENT DOCUMENTS

| JP | 3-88980 | 4/1991 |
| JP | 5-288411 | 11/1993 |
| JP | 7-167504 | 7/1995 |
| JP | 8-114346 | 5/1996 |
| JP | 9-33117 | 2/1997 |
| JP | 9-271135 | 10/1997 |
| JP | 9-271197 | 10/1997 |
| JP | 10-141739 | 5/1998 |
| WO | WO99/29035 | 6/1999 |

* cited by examiner

*Primary Examiner*—Rita Leykin
(74) *Attorney, Agent, or Firm*—McDermott, Will & Emery

(57) ABSTRACT

The present invention relates to a motor and especially to a technique for maintaining constant power consumption in preheating a compressor motor in an air conditioner. An object thereof is to permit constant preheating of the motor irrespective of variations in receiving voltage. To accomplish this object, switching control of an inverter (15) that applies a three-phase current to a motor (30) is performed by a control circuit (20) in accordance with a duty based on detected values of voltage (Vm) and current (Im). This duty decreases with increasing receiving voltage.

14 Claims, 4 Drawing Sheets

METHOD OF CONTROLLING PREHEATING POWER AND MECHANISM FOR PROVIDING PREHEATING

TECHNICAL FIELD

The present invention relates to a motor and especially to a technique for maintaining constant power consumption in preheating a compressor motor in an air conditioner. It also relates to a technique for preheating a compressor motor driven by a pulse-width modulation inverter.

BACKGROUND ART

Conventionally, lubricating oil has been employed for reducing friction at a motor bearing. This technique is also employed in compressor motors in air conditioners.

The compressor motors in air conditioners in particular handle refrigerant and have the characteristic that at low temperatures, the refrigerant is soluble in refrigeration oil which is lubricating oil. When driven at low temperatures, the compressor motors in air conditioners rotate with the refrigeration oil in small concentrations. Thus, there is a high possibility that sliding portions of the compressors will seize up by friction.

To prevent such a problem, there has been employed a technique for providing a crank heater around a compressor motor to preheat the motor before it rotates and thereby to reduce the solubility of refrigeration oil in refrigerant. Further, especially for the purpose of preheating a compressor motor driven by an inverter, there has also been employed a technique for, without providing a crank heater, supplying current from the inverter to the compressor motor on the condition that the motor should not be rotated. The current waveform not to rotate the motor is achieved, for example, by increasing frequency while reducing supply current or by employing direct current.

The technique in which the inverter supplies current on the above condition so that the compressor motor preheats itself, however, has a problem of being highly susceptible to variations in supply power. For example if the current waveform is determined to give 35 W of power consumption by preheating for a receiving voltage of 200 V, an increase of the receiving voltage to 220 V increases the power consumption by preheating to approximately 42 W, i.e., by a factor of $(220/200)^2$. This results in excessive power consumption. A decrease of the receiving voltage to 180 V, on the other hand, reduces the power consumption by preheating to approximately 28 W, i.e., by a factor of $(180/200)^2$. This results in insufficient preheating and thereby raises the possibility that the solubility of refrigeration oil in refrigerant cannot be reduced sufficiently.

DISCLOSURE OF THE INVENTION

The present invention has been made in view of the above circumstances and provides a technique for permitting constant preheating of a motor irrespective of variations in receiving voltage. The present invention also provides a technique for giving constant preheating power irrespective of a temperature of a coil of a motor.

A first aspect of the present invention is directed to a method of controlling preheating power, the method controlling preheating of a coil ($L_U$, $L_W$) of a polyphase motor (30), wherein the polyphase motor is operated open-phase to generate heat.

According to a second aspect of the present invention, in the method of controlling preheating power according to the first aspect, the polyphase motor is driven by an inverter (15), the inverter applying current to the coil ($L_U$, $L_W$) for the preheating of the polyphase motor, the current being applied with a predetermined period (T) from the inverter to the polyphase motor, on a condition that the polyphase motor should not be rotated, and as a DC voltage (Vm) applied to the inverter increases, a duty (D) which is the ratio between time during which the voltage is applied to the coil and the period, is set to a smaller value.

According to a third aspect of the present invention, in the method of controlling preheating power according to the second aspect, the current produces no revolving field for the polyphase motor in preheating the polyphase motor.

According to a fourth aspect of the present invention, in the method of controlling preheating power according to either one of the first through third aspects, the polyphase motor is a compressor motor in an air conditioner.

According to a fifth aspect of the present invention, in the method of controlling preheating power according to the second aspect, the polyphase motor is a three-phase motor, the inverter is a three-phase inverter, each phase having a pair of positive and negative switching elements ($Q_U$, $Q_V$, $Q_W$, $Q_X$, $Q_Y$, $Q_Z$), and the period includes: a first period ($t_{on}$) during which the positive switching element ($Q_U$) in a first phase (U) is in the on state, the negative switching element ($Q_Z$) in a second phase (W) is in the on state, and the positive and negative switching elements ($Q_V$, $Q_Y$) in a third phase (V) are complementarily in the on state for an equal length of time; and a second period ($t_{off}$) during which, in all of the first, second, and third phases, either the positive switching elements ($Q_U$, $Q_V$, $Q_W$) are in the on state or the negative switching elements ($Q_X$, $Q_Y$, $Q_Z$) are in the on state.

According to a sixth aspect of the present invention, in the method of controlling preheating power according to either one of the second and fifth aspects, the duty is set to a value obtained by dividing a product of a known calibrated voltage ($V_{ref}$), a known calibrated current ($I_{ref}$), and a known calibrated duty ($D_0$) by a product of a current ($I_m$) and a voltage ($V_m$) applied to the motor.

According to a seventh aspect of the present invention, in the method of controlling preheating power according to the second aspect, the duty is set to a larger value as a temperature of the polyphase motor increases.

According to an eighth aspect of the present invention, in the method of controlling preheating power according to the second aspect, the preheating is performed on refrigeration oil in a compressor.

A ninth aspect of the present invention is directed to a preheating system comprising: a polyphase motor (30) having coils ($L_U$, $L_W$); and an operation control unit for operating the polyphase motor open-phase to generate heat.

According to a tenth aspect of the present invention, in the preheating system according to the ninth aspect, the operation control unit includes an inverter (15), the inverter applying current to the polyphase motor with a predetermined period (T), on a condition that the polyphase motor should not be rotated, and as a DC voltage (Vm) applied to the inverter increases, a duty (D) which is the ratio between time during which the voltage is applied to the coil and the period, is set to a smaller value.

According to an eleventh aspect of the present invention, in the preheating system according to the tenth aspect, in the preheating of the polyphase motor, the current produces no revolving field for the polyphase motor.

According to a twelfth aspect of the present invention, in the preheating system according to either one of the ninth through eleventh aspects, the polyphase motor is a compressor motor in an air conditioner.

According to a thirteenth aspect of the present invention, in the preheating system according to the tenth aspect, the polyphase motor is a three-phase motor, the inverter is a three-phase inverter, each phase having a pair of positive and negative switching elements ($Q_U$, $Q_V$, $Q_W$, $Q_X$, $Q_Y$, $Q_Z$), and the period includes: a first period ($t_{on}$) during which the positive switching element ($Q_U$) in a first phase (U) is in the on state, the negative switching element ($Q_Z$) in a second phase (W) is in the on state, and the positive and negative switching elements ($Q_V$, $Q_Y$) in a third phase (V) are complementarily in the on state for an equal length of time; and a second period ($t_{off}$) during which, in all of the first, second, and third phases, either the positive switching elements ($Q_U$, $Q_V$, $Q_W$) are in the on state or the negative switching elements ($Q_X$, $Q_Y$, $Q_Z$) are in the on state.

According to a fourteenth aspect of the present invention, in the preheating system according to either one of the tenth and thirteenth aspects, the duty is set to a value obtained by dividing a product of a known calibrated voltage ($V_{ref}$), a known calibrated current ($I_{ref}$), and a known duty ($D_0$) by a product of a current (Im) and a voltage (Vm) applied to the motor.

According to a fifteenth aspect of the present invention, in the preheating system according to the tenth aspect, the duty is set to a larger value as a temperature of the polyphase motor increases.

According to a sixteenth aspect of the present invention, in the preheating system according to the tenth aspect, the preheating is performed on refrigeration oil in a compressor.

In the method of controlling preheating power according to the first aspect of the present invention and in the preheating system according to the ninth aspect, the polyphase motor is operated open-phase to generate heat and thereby to be preheated.

In the method of controlling preheating power according to the second aspect of the present invention and in the preheating system according to the tenth aspect, since variations in the DC voltage applied to the inverter are compensated by varying the duty, preheating can be achieved with predetermined power irrespective of the variations in the DC voltage. This avoids excess power consumption and insufficient preheating.

In the method of controlling preheating power according to the third aspect of the present invention and in the preheating system according to the eleventh aspect, since no revolving field is provided for the polyphase motor, the polyphase motor can be preheated without being rotated. This prevents the occurrence of such mutually contradictory phenomena that heat generation causes the bearing to be worn out. Besides, the generation of sound can be minimized because a so-called "slip" is not utilized which is a phenomenon that the revolving field is produced but the motor is not rotated.

In the method of controlling preheating power according to the fourth aspect of the present invention and in the preheating system according to the twelfth aspect, the solubility of lubricating oil in refrigerant which is handled by the compression motor in the air conditioner, can be reduced. This prevents a situation in which, with refrigeration oil which is lubricating oil being dissolved in refrigerant and reduced in concentration, the motor is rotated and thereby the bearing will seize up by friction.

In the method of controlling preheating power according to the fifth aspect of the present invention and in the preheating system according to the thirteenth aspect, during the first period, the positive and negative switching elements in the third phase are complementarily in the on state for an equal length of time; therefore, substantially no current flows to the coil in the third phase in the polyphase motor. During the second period, the inductance of the coils in the first and second phases in the motor maintains the current flow occurring during the first period. Accordingly, current continues to flow in the same direction to the series connection of the coils in the first and second phases, which allows almost constant current to continuously flow to the motor without generating a revolving field.

In the method of controlling preheating power according to the sixth aspect of the present invention and in the preheating system according to the fourteenth aspect, the duty is the value obtained by dividing desired power by the product of current and voltage applied to the motor. This allows constant preheating power to be given irrespective of the values of current and voltage applied to the motor.

With increase in temperature, the DC resistance of the coil increases and the current flowing to the motor decreases. In the method of controlling preheating power according to the seventh aspect of the present invention and in the preheating system according to the fifteenth aspect, however, preheating power can be increased by increasing the duty. Accordingly, the preheating power can be set to a desired value irrespective of the temperature of the polyphase motor.

In the method of controlling preheating power according to the eighth aspect of the present invention and in the preheating system according to the sixteenth aspect, refrigeration oil is hardly soluble in refrigerant and thus the motor can be prevented from being rotated with the refrigeration oil reduced in concentration. This prevents a sliding portion of the compressor from seizing up by friction.

These and other objects, features, aspects and advantages of the present invention will become more apparent from the following detailed description of the present invention when taken in conjunction with the accompanying drawings.

BEST MODE FOR CARRYING OUT THE INVENTION

First Embodiment

Figure 1:
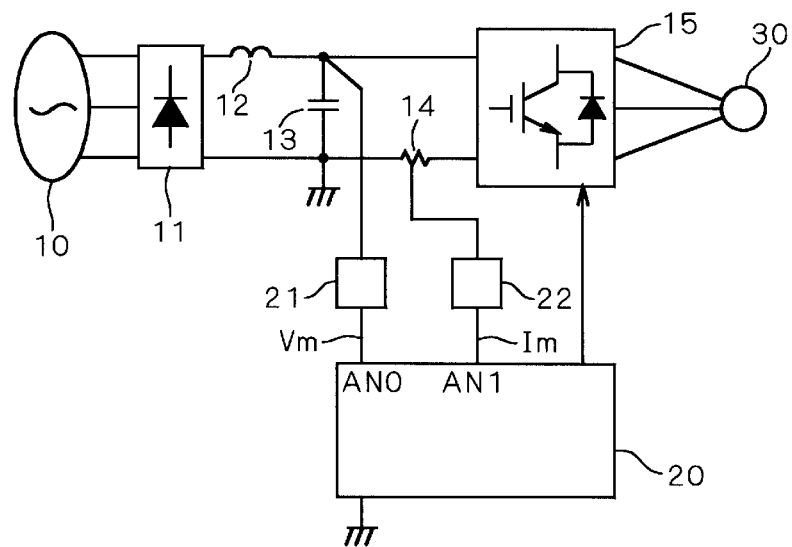
FIG. 1 is a circuit diagram for explaining a first embodiment of the present invention.

FIG. 1 is a circuit diagram illustrating a compressor motor 30 and its driving circuit in an air conditioner, to which a control method according to a first embodiment of the present invention is applied. For example, a voltage supplied from a three-phase AC power supply 10 is converted into a DC current with a ripple by a diode bridge 11 of a well-known configuration. The DC current is then passed through, for example, a choke input filter and a DC voltage is applied to an inverter 15. The inverter 15 performs switching of pulse-width modulation under the control of a control circuit 20 and supplies, for example, a three-phase AC voltage to a motor 30.

The choke input filter, as shown in FIG. 1, is configured of a capacitor 13 having one end connected to a negative output terminal of the diode bridge 11 and the other end, and an inductor 12 interpolated between the other end of the capacitor 13 and a positive output terminal of the diode bridge 11. The negative output terminal of the diode bridge 11 is grounded, for example.

The control circuit 20 is configured for example of a central processing unit and controls the operation of the inverter 15. In normal operation, as a matter of course, the inverter 15 is caused to rotate the motor 30, while in preheating operation, the inverter 15 is caused to perform switching of power supply to the motor 30 without rotating the motor 30. The control circuit 20 has two analog input ports AN0 and AN1, the former receiving a detected value of voltage Vm from a voltage detecting circuit 21 and the latter receiving a detected value of current Im from a current detecting circuit 22.

The voltage detecting circuit 21 is configured for example of a filter. It measures a voltage at the junction between the inductor 12 and the capacitor 13 and outputs it as the detected value of voltage Vm. The current detecting circuit 22 is configured for example of a peak hold circuit or an averaging circuit. It measures a current flowing between the negative output terminal of the diode bridge 11 and the inverter 15 and outputs it as the detected value of current Im. For the current measurement, a resistor 14 is interpolated, for example, between the negative output terminals of the diode bridge 11 and the inverter 15, and a voltage drop at the resistor 14 is measured. As long as the voltage and current applied to the motor 30 can be measured, the measurements may be made in ways other than the above embodiment; for example, the voltage and current may be measured at positions closer to the AC voltage supply 10 than to the diode bridge 11.

FIGS. 2 to 5 are circuit diagrams for explaining the operation of the inverter 15, in which, for the purpose of preheating a coil of the motor 30, a DC current is supplied so that the motor 30 generates heat through its so-called open-phase operation. In either of the drawings, the voltage applied between the positive and negative input terminals of the inverter 15 is indicated as a virtual power supply $E_d$. Transistors $Q_U$, $Q_V$, $Q_W$, $Q_X$, $Q_Y$, and $Q_Z$ are respectively a positive switching transistor in U phase, a positive switching transistor in V phase, a positive switching transistor in W phase, a negative switching transistor in the U phase, a negative switching transistor in the V phase, and a negative switching transistor in the W phase. The motor 30 further has a Y connection of a U-phase coil $L_U$, a V-phase coil $L_V$, and a W-phase coil $L_W$.

A pair of the transistors $Q_U$ and $Q_X$, a pair of the transistors $Q_V$ and $Q_Y$, and a pair of the transistors $Q_W$ and $Q_Z$ each are connected in series between the positive and negative input terminals of the inverter 15. In each phase, a connection is established between the junction of the pair of transistors and the coil of the motor 30. In each pair, the positive and negative switching transistors are never turned on at the same time. The description in this embodiment is given without reference to a so-called dead time during which both the positive and negative transistors are turned off at the same time.

In the drawings, both the thick and thin solid lines indicate conducting paths, and the broken line indicates non-conducting paths. The thick solid line indicates a path through which current substantially flows, whereas the thin solid line indicates a path through which current does not flow substantially. Hereinbelow, this embodiment illustrates the case where the current substantially flows from the U phase to the V phase, but it goes without saying that those phases may be any other combination of two phases.

FIGS. 2, 3, 4, and 5 illustrate the paths of current flowing responsive to voltage vectors $V_0$, $V_4$, $V_6$, and $V_7$, respectively. The expression of the voltage vector $V_k$ can be determined from $k=2^2 B_U + 2^1 B_V + 2^0 B_W$, where $B_U$, $B_V$, and $B_W$ are variables for the U, V, and W phases, respectively, each representing the "ON" state of the positive switching transistor as a value of 1 and the "ON" state of the negative switching transistor as a value of 0. A transition from such one voltage vector to another is achieved by the control circuit 20 that controls voltages applied to the gates of the switching transistors $Q_U$, $Q_V$, $Q_W$, $Q_X$, $Q_Y$, and $Q_Z$.

Figure 2:
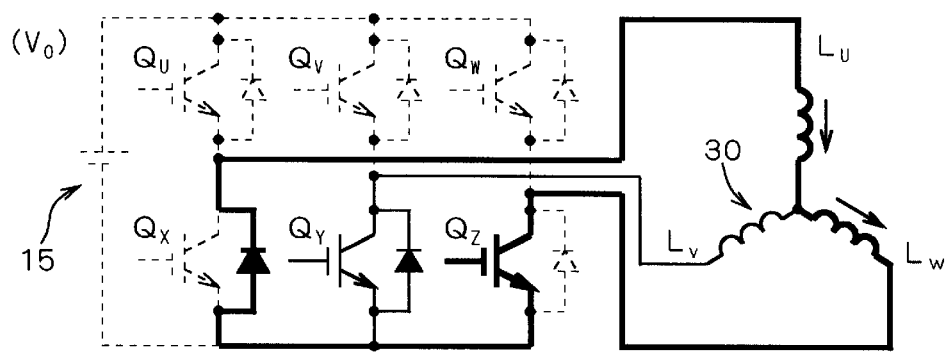
FIGS. 2 to 5 are circuit diagrams for explaining operations according to the first embodiment of the present invention.

Referring to FIG. 2, in either of the U, V, and W phases, the negative switching transistor $Q_X$, $Q_Y$, or $Q_Z$ is in the on state; therefore, no voltage is applied to the motor 30. However, the inductance of the U-phase coil $L_U$, the V-phase coil $L_V$, and the W-phase coil $L_W$ of the motor 30 maintains the current flow responsive to the other voltage vectors. In voltage vector forms described later, current flows from the U-phase coil $L_U$ to the W-phase coil $L_W$; thus, the maintenance of such current flow is illustrated in FIG. 2.

Figure 3:
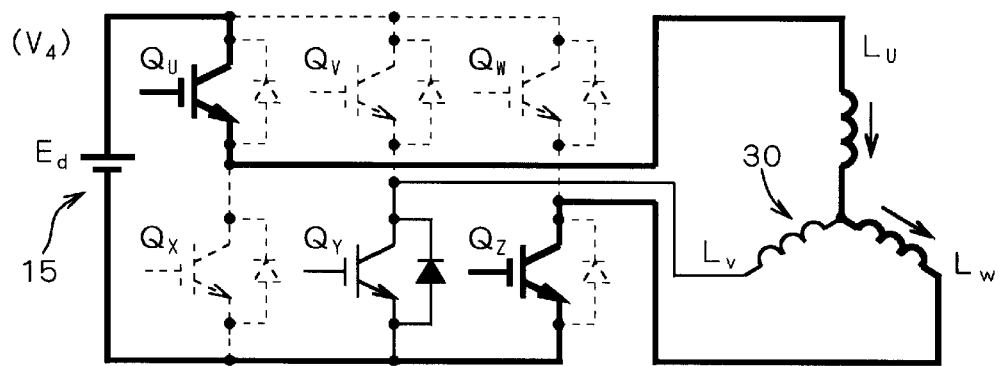

Referring to FIG. 3, the positive switching transistor $Q_U$ in the U phase and the negative switching transistors $Q_Y$ and $Q_Z$ in the V and W phases are in the on state. Thus, a voltage $E_d$ is applied to the series connection between the U-phase coil $L_U$ and the W-phase coil $L_W$. At this time, the voltage $E_d$ is also applied to the series connection between the U-phase coil $L_U$ and the V-phase coil $L_V$; therefore, a transient current can flow from the U-phase coil $L_U$ to the V-phase coil $L_V$.

Figure 4:
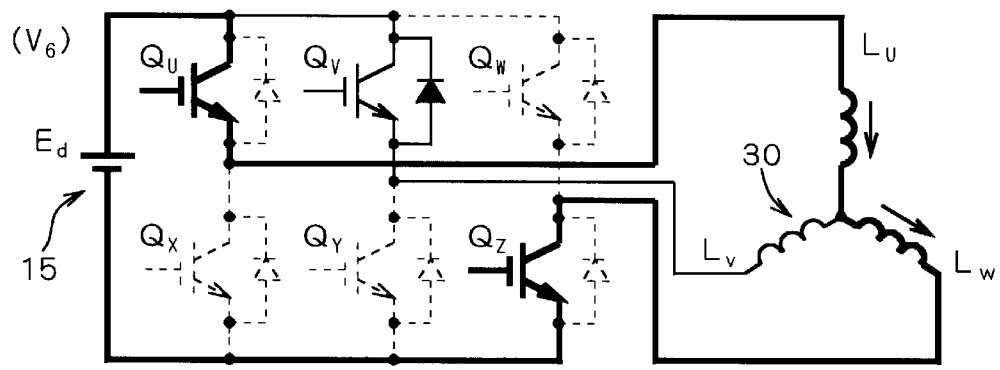

Referring to FIG. 4, the positive switching transistors $Q_U$ and $Q_V$ in the U and V phases and the negative switching transistor $Q_Z$ in the W phase are in the on state. Thus, the voltage $E_d$ is applied to the series connection between the U-phase coil $L_U$ and the W-phase coil $L_W$. At this time, the voltage $E_d$ is also applied to the series connection between the V-phase coil $L_V$ and the W-phase coil $L_W$; therefore, a transient current can flow from the V-phase coil $L_V$ to the W-phase coil $L_W$.

Figure 5:
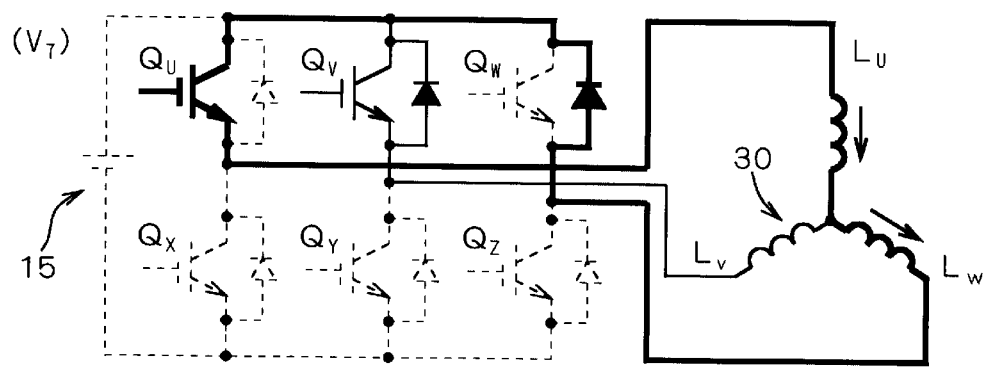

Referring to FIG. 5, in either of the U, V, and W phases, the positive switching transistor $Q_U$, $Q_V$, or $Q_W$ is in the on state; therefore no voltage is applied to the motor 30. However, as in the case of the voltage vector $V_0$, the current flow from the U-phase coil $L_U$ to the W-phase coil $L_W$ is maintained, which is illustrated in FIG. 5.

These four voltage vector forms are periodically repeated by the inverter 15. In the cases of the voltage vectors $V_4$ and $V_6$, the flows of current to the V-phase coil $L_V$ are opposite in direction. Thus, if the inverter 15 is driven for an equal length of time in both the above cases and the four voltage vector forms are repeated at some frequency, little current flows to the V-phase coil $L_V$ on account of the inductance. Accordingly, substantially no current flows to the V-phase coil $L_V$ when the current flows from the U-phase coil $L_U$ to the W-phase coil $L_W$.

If the four voltage vector forms $V_0$, $V_4$, $V_6$, and $V_7$ are repeated in this order with a period T, no voltage is applied to the motor 30 throughout the periods of the voltage vectors $V_0$ and $V_7$, whereas the voltage $E_d$ is applied to the motor 30 throughout the periods of the voltage vectors $V_4$ and $V_6$. Besides, although the current continues to flow to the motor 30, no revolving field is provided and thus the motor 30 generates heat without being rotated. This prevents the occurrence of such mutually contradictory phenomena that heat generation causes the bearing to be worn out and thereby allows preheating of refrigeration oil in the motor 30.

Figure 6:
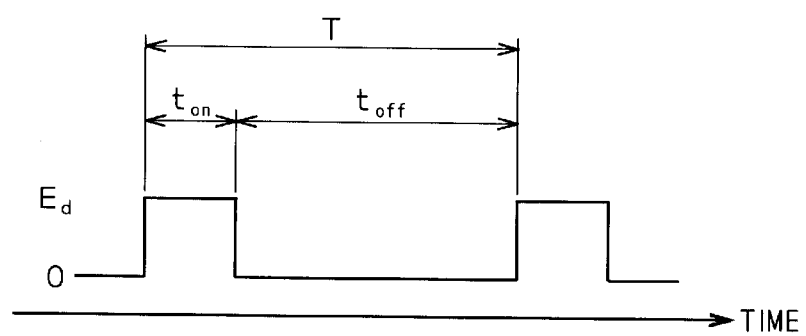
FIG. 6 is a graph for explaining the operations according to the first embodiment of the present invention.

FIG. 6 is a graph illustrating the voltage applied to the series connection between the U and W phases, i.e., between the U-phase coil $L_U$ and the W-phase coil $L_W$, with the passage of time. The period $t_{on}$ is the sum of the periods during which the voltage vectors $V_4$ and $V_6$ are realized, and the period $t_{off}$ is the sum of the periods during which the voltage vectors $V_0$ and $V_7$ are realized. In other words, the period $t_{on}$ is the period during which the positive switching transistor $Q_U$ in the U phase and the negative switching transistor $Q_Z$ in the W phase are in the on state and the positive and negative switching transistors $Q_V$ and $Q_Y$ in the V phase are complementarily in the on state for an equal length of time. The period $t_{off}$ is the period during which, in all the phases, either the positive switching transistors $Q_U$, $Q_V$, and $Q_W$ are in the on state or the negative switching transistors $Q_X$, $Q_Y$, and $Q_Z$ are in the on state. As above described, without reference to the dead time, the following equation holds: $T=t_{on}+t_{off}$. A duty that the voltage $E_d$ is on during the period T can be expressed as $D=t_{on}/T$.

Now, power consumption that would be desirable for preheating is predetermined as $W_{ref}$. Further, the detected values of voltage Vm and current Im for the receiving voltage of 200 V, for example, are previously stored in the control circuit 20 as a calibrated voltage $V_{ref}$ and a calibrated current $I_{ref}$, respectively. To give the desired power consumption $W_{ref}$ by controlling the inverter 15, it is desirable that $D=W_{ref}/(V_{ref} \cdot I_{ref})$ since it is assumed that the motor 30 receives a voltage of $(V_{ref} \cdot D)$ on average and the current $I_{ref}$ continuously flows throughout all the periods. The value of the duty D at this time is also stored as a calibrated duty $D_0$. That is, when the receiving voltage is a predetermined voltage, the duty D is varied while measuring preheating power consumed by the motor 30, whereby the duty D and the detected value of current Im at the time of the preheating power $W_{ref}$ is defined as the calibrated duty $D_0$ and the calibrated current $I_{ref}$.

In preheating after such calibration, the duty D is controlled to be equal to $D_0 \times (V_{ref} \cdot I_{ref})/(Vm \cdot Im)$ This gives $D \cdot Vm \cdot Im = D_0 \cdot V_{ref} \cdot I_{ref} = W_{ref}$, thereby allowing the generation of desired preheating power. As has previously been described, the detected values of voltage Vm and current Im are given into of the control circuit 20 via the analog input ports AN0 and AN1 respectively, and the calibrated duty $D_0$, the calibrated current $I_{ref}$ and the calibrated voltage $V_{ref}$ are stored in the control circuit 20. Therefore, if the control circuit 20 controls the periods during which the voltage vectors $V_0$, $V_4$, $V_6$, and $V_7$ are realized, the duty D can be varied according to the above equation.

With the above operations, even if the detected values of voltage Vm and current Im change with variations in the receiving voltage, those changes can be cancelled by the duty D. This allows preheating with constant power consumption $W_{ref}$, i.e., avoids both excessive power consumption and insufficient preheating.

While the present invention has been described with reference to the embodiment that employs the voltage vector forms which do not produce the revolving field, even if the revolving field is produced, the transition of the voltage vectors should be made at frequencies not to rotate the motor 30. In this case, however, a so-called "motor slip" occurs and thereby the sound from the motor becomes louder. From this point, this embodiment is more advantageous.

Second Preferred Embodiment

Figure 7:
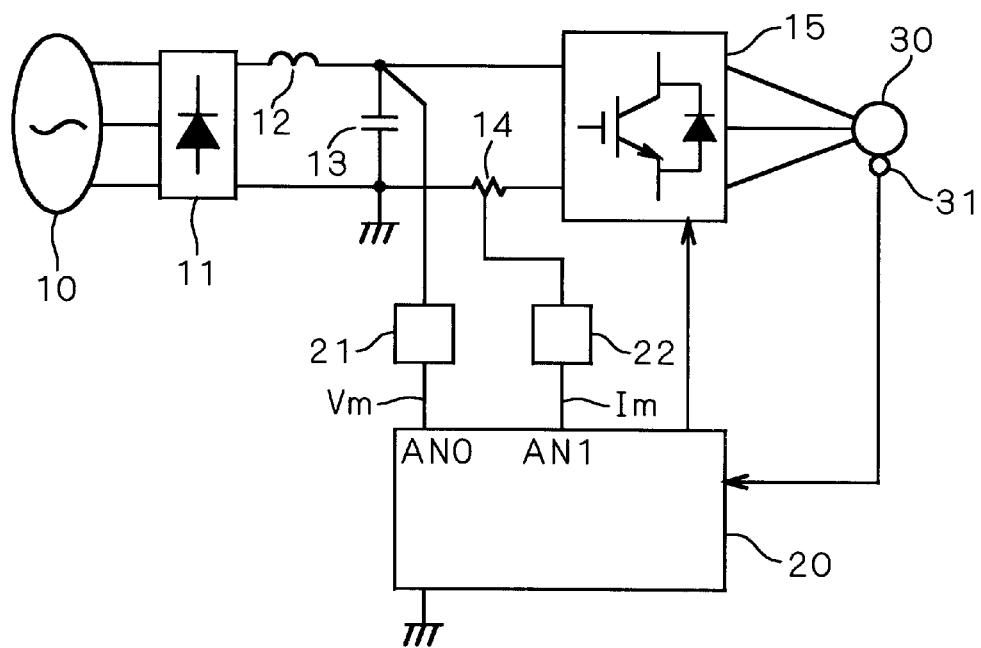
FIG. 7 is a circuit diagram for explaining a second embodiment of the present invention.

FIG. 7 is a circuit diagram illustrating the compressor motor 30 and its driving circuits in the air conditioner, to which a control method according to a second embodiment of the present invention is applied. This embodiment differs from the first embodiment in that the motor 31 comprises a temperature sensing element 31, from which the control circuit 20 receives data.

The magnitude of the impedance of the motor 30 can be generally expressed by $Z=(\omega^2 L^2+R^2)^{1/2}$, where R is the DC resistance of a coil of the motor, L is the inductance, and $\omega$ is the frequency of a given current. If the current flow is constant as in the first embodiment, the impedance can roughly be determined by the DC resistance R.

Here, the DC resistance R of the coil has temperature dependence that it increases with temperature. Thus, where the detected value of voltage Vm is constant, the detected value of current Im decreases with increasing temperature, and where the duty D is also constant, preheating power decreases as well. Compensation for preheating can be made even with such temperature variations in the impedance of the motor 30.

More specifically, the temperature of the motor 30 is measured by the temperature sensing element 31 and the data obtained is transmitted to the control circuit 20. By previously inputting the temperature dependence of the DC resistance R to the control circuit 20, control can be exercised to cancel the temperature dependence by increasing the value of the duty, for example, with increasing temperature obtained from the temperature sensing element 31. The reason for increasing the value of the duty is to increase an average value of the voltage applied to the motor and thereby to increase preheating power. That is, preheating power can be set to a desired value irrespective of the temperature of the motor 30.

This technique is also applicable to the case where alternating current is applied to the motor 30 for heat generation.

While the invention has been shown and described in detail, the foregoing description is in all aspects illustrative and not restrictive. It is therefore understood that numerous modifications and variations can be devised without departing from the scope of the invention.

What is claimed is:

1. A method of controlling preheating power applied to a polyphase motor comprising:
   coupling said polyphase motor to an inverter (15),
   applying current from said inverter to a winding ($L_U$, $L_W$) of said polyphase motor in open-phase operation for preheating said polyphase motor,
   said current being applied during a predetermined period (T) in which said polyphase motor does not rotate, with a duty cycle (D) that is a ratio between time during which current is applied and said period, and
   varying the duty cycle inversely with respect to a change in a DC voltage ($V_m$) applied to said inverter.

2. The method of controlling preheating power according to claim 1, wherein
   in said preheating of said polyphase motor, said current produces no revolving field for said polyphase motor.

3. The method of controlling preheating power according to either one of claims 1 and 2, wherein
   said polyphase motor is a compressor motor in an air conditioner.

4. The method of controlling preheating power according to claim 1, wherein said polyphase motor is a three-phase motor, said inverter is a three-phase inverter, each phase having a pair of positive and negative switching elements ($Q_u$, $Q_v$, $Q_w$, $Q_y$, $Q_z$), and said period includes:

a first period ($t_{on}$) during which said positive switching element ($Q_u$) in a first phase (U) is in the on state, said negative switching element ($Q_z$) in a second phase (W) is in the on state, and said positive and negative switching elements ($Q_v$; $Q_y$) in a third phase (V) are complementarily in the on state for an equal length of time; and a second period ($t_{off}$) during which, in all of said first, second, and third phases, either said positive switching elements ($Q_u$, $Q_v$, $Q_w$) are in the on state or said negative switching elements ($Q_x$, $Q_y$, $Q_z$) are in the on state.

5. The method of controlling preheating power according to either one of claims 1 and 4, wherein said duty is set to a value obtained by dividing a product of a known calibrated voltage ($V_{ref}$), a known calibrated current ($I_{ref}$), and a known calibrated duty ($D_0$) by a product of a current (Im) and a voltage (Vm) applied to said motor.

6. The method of controlling preheating power according to claim 1, wherein said duty is set to a larger value as a temperature of said polyphase motor increases.

7. The method of controlling preheating power according to claim 1, wherein said preheating is performed on refrigeration oil in a compressor.

8. A preheating system comprising:

a polyphase motor, and an operation control unit for operating said polyphase motor open-phase to generate heat, wherein said operation control unit includes an inverter (15), said inverter applying current to said polyphase motor during a predetermined period (T), in which said polyphase motor does not rotate, with a duty cycle (D) that is a ratio between time during which current is applied and said period, and the duty cycle varies inversely with respect to a change in a DC voltage ($V_m$) applied to said inverter.

9. The preheating system according to claim 8, wherein in said preheating of said polyphase motor, said current produces no revolving field for said polyphase motor.

10. The preheating system according to either one of claims 8 and 9, wherein said polyphase motor is a compressor motor in an air conditioner.

11. The preheating system according to claim 8, wherein said polyphase motor is a three-phase motor, said inverter is a three-phase inverter, each phase having a pair of positive and negative switching elements ($Q_u$, $Q_v$, $Q_w$, $Q_y$, $Q_z$), and said period includes:

a first period ($t_{on}$) during which said positive switching element ($Q_u$) in a first phase (U) is in the on state, said negative switching element ($Q_z$) in a second phase (W) is in the on state, and said positive and negative switching elements ($Q_v$; $Q_y$) in a third phase (V) are complementarily in the on state for an equal length of time; and a second period ($t_{off}$) during which, in all of said first, second, and third phases, either said positive switching elements ($Q_U$, $Q_V$, $Q_w$) are in the on state or said negative switching elements ($Q_x$, $Q_y$, $Q_z$) are in the on state.

12. The preheating system according to either one of claims 10 and 11, wherein said duty is set to a value obtained by dividing a product of a known calibrated voltage ($V_{ref}$), a known calibrated current ($I_{ref}$), and a known calibrated duty ($D_0$) by a product of a current (Im) and a voltage (Vm) applied to said motor.

13. The preheating system according to claim 8, wherein said duty is set to a larger value as a temperature of said polyphase motor increases.

14. The preheating system according to claim 8, wherein said preheating is performed on refrigeration oil in a compressor.

* * * * *

UNITED STATES PATENT AND TRADEMARK OFFICE
CERTIFICATE OF CORRECTION

PATENT NO. : 6,617,819 B2
DATED : September 9, 2003
INVENTOR(S) : Hiroshi Dohmae It is certified that error appears in the above-identified patent and that said Letters Patent is hereby corrected as shown below:

Title page,
Item [*] Notice, "0 days" should be -- 4 days --

Signed and Sealed this

Seventh Day of June, 2005

JON W. DUDAS
*Director of the United States Patent and Trademark Office*